Nov. 11, 1924 1,514,961
J. GOLDMAN
AMUSEMENT APPARATUS
Filed Aug. 20 1923  2 Sheets-Sheet 1
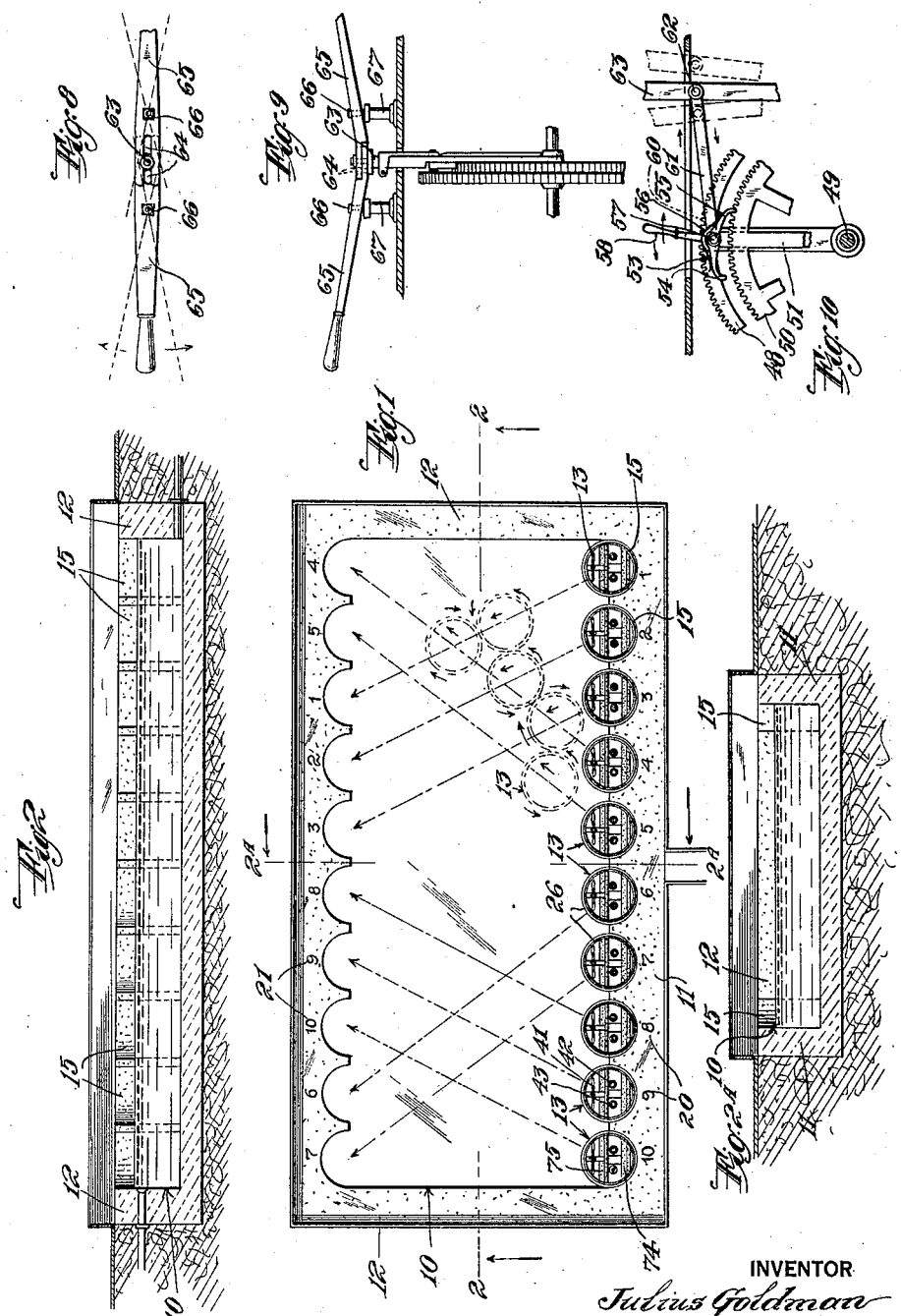
INVENTOR
Julius Goldman
BY
William S. Gluck
ATTORNEY

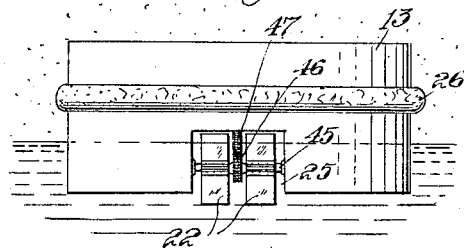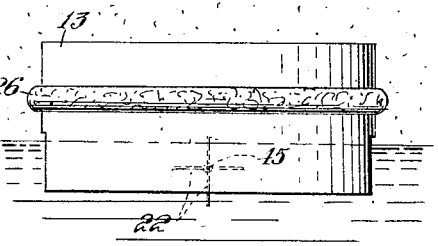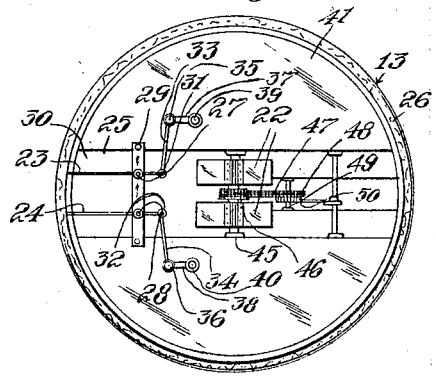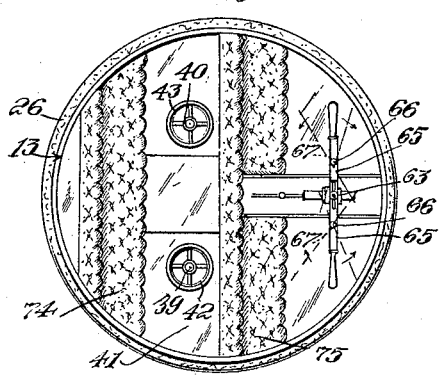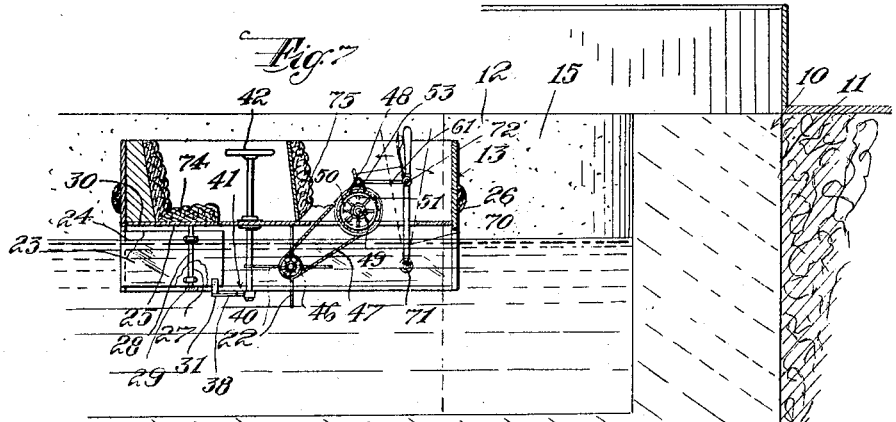

Patented Nov. 11, 1924.

1,514,961

UNITED STATES PATENT OFFICE.

JULIUS GOLDMAN, OF ATLANTIC CITY, NEW JERSEY.

AMUSEMENT APPARATUS.

Application filed August 20, 1921. Serial No. 493,966.

*To all whom it may concern:*

Be it known that I, JULIUS GOLDMAN, a citizen of the United States, and a resident of Atlantic City, State of New Jersey, have invented a new and useful Improvement in Amusement Apparatus, of which the following is a specification.

My present invention relates to apparatus especially intended for amusement and more particularly to apparatus which includes the use of vehicle construction and to an arrangement whereby a plurality of vehicles are caused to move in predetermined paths to produce an effect that will be highly interesting as well as amusing.

Although this apparatus is particularly intended as an amusement apparatus and is so illustrated and described, it will be obvious, as this description proceeds, that features thereof are capable of a wider field of utility, and the disclosure of the various features of my invention in connection with an amusement apparatus will be for purposes of convenience only as to such phases that have such wider field of utility.

As an amusement apparatus generally, my invention is intended to be in the nature of a race between vehicles to see which can arrive at a predetermined point first, the path each vehicle is to follow and the shape of each vehicle being such as to cause the greatest possible amount of interference with its progress. Furthermore the means for propelling and controlling the direction of travel of the vehicles are designed in such a way as to require the cooperation of a number of operators, and are particularly designed to render such cooperation rather complicated and amusing.

Among the more important objects of my invention are: the provision of an arrangement whereby vehicles moving from predetermined starting positions to predetermined terminal positions are compelled to follow paths which interfere and cross each other and more particularly the provision with such an arrangement of characteristics whereby the predetermined terminal position of each vehicle is indicated: the provision furthermore with a plurality of starting positions or stations and a plurality of terminal stations of indicating characteristics for each station, of such character that the indicating characteristics of the starting stations are each different, with each of those in the terminal stations corresponding to one of those in the starting stations: the provision of vehicles arranged and constructed so that they can engage and bump each other without damage to the vehicles or discomfort to the occupants thereof; and more particularly of vehicles which are arranged and constructed to retard each other's progress as far as possible: the provision of a vehicle in which the direction of movement is adapted to be controlled by a plurality of persons, and more particularly the provision of a vehicle in which each of a plurality of persons can control the direction of movement of the vehicle independently of the other; the provision of a plural direction control for a vehicle so arranged that the controls are cumulative only when they are properly coordinated: the provision of an arrangement for propelling a vehicle which requires the coordinated effort of a plurality of persons, and more particularly one in which the plural drive of the vehicle is combined with a plural direction control thereof: the provision more particularly of vehicles designed to move through water: and the provision generally of an amusement apparatus which will provide a number of features which will be both highly interesting and entertaining as well as instructive.

In attaining the foregoing objects, and certain additional benefits and advantages that will appear or be pointed out below, I have provided a construction, one embodiment of which is illustrated in the accompanying drawings, in which—

Fig. 1 is a top plan view of a water race course with all the vehicles in starting position;

Fig. 2 is a longitudinal section through the tank of Fig. 1 taken on the line 2—2 of Fig. 1 looking in the direction of the arrows;

Fig. 2ᴬ is a transverse section through the tank taken on line 2ᴬ—2ᴬ of Fig. 1;

Fig. 3 is a view in front elevation of the vehicle used;

Fig. 4 is a view similar to that of Fig. 3, taken at right angles thereto;

Fig. 5 is a plan view of the bottom of a vehicle looking upwardly;

Fig. 6 is a top plan view looking down upon the vehicle from above;

Fig. 7 is a section through the water course showing a slightly modified embodiment of the vehicle in central longitudinal section;

Figs. 8 and 9 are top plan and side elevational views respectively on an enlarged scale of a detail shown in Fig. 6; and Fig. 10 is an enlarged detail in side elevation showing the modified feature of Fig. 7.

Upon viewing Figs. 1 and 2, it will be seen that I have illustrated my invention as used in connection with a body of water and the vehicles as particularly intended for use in water. This I have done because the objects of my invention will probably be most popularly served and attained in this connection, although as will be obvious, the attainment of the general objects of my invention does not necessarily require the use of my apparatus in this connection. In the drawings the water course has furthermore been illustrated as an enclosed pool or tank for purposes of convenience only, as an open body of water will serve equally well.

The enclosed pool, indicated generally by the reference character 10, has the sides 11 and the ends 12, it being intended that the path of movement of each of the vehicles participating in the race or contest start from one side and finish at the other, or if preferred, start at one side, touch at the other and return to the starting point. While in this specification, I will describe the former, this is merely for purposes of convenience. The vehicles 13 are illustrated in Fig. 1 as all on one side of the tank 10 which side can be referred to, for the moment, as the starting position of the vehicles, and as these vehicles 13 are preferably made tub-like or circular in horizontal cross section for purposes that will be pointed out, it is found preferable to have the starting and finishing positions of both sides of the pool in the form of the semicircular berths 15, in which the vehicles 13 are received.

Where the paths to be followed by the vehicles are parallel and non-interfering, the exciting element always present in a race will be present here also, but the amusement feature will be more or less negligible. To enhance this latter feature, I have arranged that the vehicles shall interfere with and impede each other as much as possible. This end I have attained, in the embodiment illustrated, by arranging that each vehicle 13 starting from a point or berth 15 at one side must reach a predetermined berth or finishing point on the opposite side and these predetermined berths are so arranged that the vehicles must almost necessarily bump each other about the pool. For instance the five vehicles 13 shown at the right in Fig. 1 must each follow the paths indicated by the dotted line leading therefrom, and finishing at the berth indicated by the arrow head. As can be seen from the diameter of the vehicles or boats 13, the paths to be followed, and the dimensions of the pool, the five vehicles referred to will each almost necessarily interfere first with one and then with another of the rest of the five until one of the vehicles disengages itself from the others and assumes a leading position, in which case that vehicle should ordinarily reach its goal before the others.

Upon viewing Fig. 1 it will be further noticed that provision is made in the tank for two groups of five boats each, and that the paths are so arranged that there is in effect two distinct races one between the five boats on the left and the other between the five boats on the right. Although groups of five will probably give the desired results in a very satisfactory way, it is obvious that the number may be varied with the variations in the dimensions of either the tank or the boats. By employing two groups as illustrated or more than two if desired, a double race is in fact produced, namely, a race within each group, and then a race between the leading boats of each group.

To avoid any confusion, I have thought it advisable to clearly indicate at which point or berth each boat must finish. This indication may be of any character whatsoever, such as numbers, letters, colors or shapes but for the purpose of convenience and simplicity I have illustrated the use of the numbers such as 1 to 10, as clearly shown at 20 in Fig. 1. In addition I have found it advisable to give a characteristic to each starting berth which is either similar to or corresponding to the indication or characteristic used in connection with the corresponding finishing berth or station. In the drawing I have illustrated the use of the same numbers 1 to 10 as shown at 21. In other words a boat 13 starting out from berth numbered 10 must finish at berth number 10. If desired each boat may also be given a characteristic indication which will correspond to that used in connection with its starting and finishing berths. For instance the boats can be numbered 1 to 10, boat numbered 1 starting from berth number one and finishing on the other side at berth numbered 1.

As the vehicles 13 are illustrated as used in connection with the water course 10, in other words that the vehicles 13 are in fact boats, I have provided them with propelling means which, as will be seen on viewing Figs. 3 and 4, take the form of the paddle wheel propellers 22, and with direction controlling or steering means which are illustrated in Fig. 5 as the rudders 23, 24.

As can be seen from the drawings, the boats or vehicles 13 are each preferably circular or tub like in shape, and are each provided in its lower half with the diametrical through passage 25 open to the water at both ends and below. The propelling and steering apparatus of each boat 13 is positioned in this passage 25 and perform their desired functions in connection with the water in said passage.

Due to the character of paths to be folowed by the different boats 13, the interference of one boat with another will only infrequently be in the form of a "head on bump or collision", and will generally be a "side swipe" (i. e., a blow whose line of force is not diametrically through the bumping boats.) Due to the circular shape of the boats. a blow of this character will tend to spin the boats about their vertical axes somewhat as shown by the arrows and dotted line boats in Fig. 1.

When therefore the boats begin bumping each other, they will be diverted from their desired directions of movement, if not also from the shortest path and as the boats are of a character which do not quickly answer to the rudder, it will require considerable maneuvering to bring the boats around to the desired direction of movement, which as is obvious is in a line with the passage 25. To minimize the effect of the blow as the boats 13 bump into each other, each boat is provided with the circumferential spring bumper 26, which acts as a shock absorber.

As will be seen upon viewing Fig. 5 of the drawing, two rudders 23, 24 are illustrated, these rudders being supported in the passage 25 toward what will hereafter be referred to as the rear of the boat. These rudders are each swingingly mounted upon one of the vertical posts 27, 28, fixed between the cross piece 29 and the upper wall 30 of the passage 25. These rudders 23, 24 are positioned symmetrically of the passage 25, one to each side of the vertical median line through the passage 25.

Pivoted to the front end of each rudder 23, 24 at 31, 32 are the outwardly oppositely extending links 33, 34 to the free ends of which at 35, 36 are pivoted the cranks 37 and 38 each secured to the lower end of the vertical steering posts 39, 40 extending through the bottom 41 of the boat 13 on opposite sides of the passage 25. These steering posts 39, 40 are operated by the steering wheels 42, 43. It will therefore be seen that I have thus provided a direction control for the vehicle 13 which can be independently controlled by each of a number of persons. Furthermore unless these controls are all operated in the same direction the effects thereof will negative each other. In other words, the steering of the boat will be effective only to the extent to which the operation of both steering wheels 42, 43 is coordinated. Although the use of two rudders each controlled by a separate person has been illustrated in the drawing, it is obvious that the number of controls can be increased to require a greater number of persons, and the rudder construction may be so arranged that a single rudder can be controlled by the resultant of the movement of two or more controls.

Although the vehicle may be propelled in any desired or preferred manner, it will be found that propelling means such as I will not proceed to describe are additionally effective for attaining the desired objects. As the vehicle has been illustrated and described as used in connection with fluid such as water, in other words as a boat, it will be seen, upon viewing Figures 3 and 4 that I have illustrated the use of two straight bladed paddle wheels 22 mounted substantially midway of the passage 25 upon a shaft 45 rotatably supported in the walls of the passage 25, the shaft 45 being driven by a small sprocket 46 mounted intermediate the paddle wheels 22, which in turn is driven by the chain 47 passing around the large sprocket 48 fixed to the shaft 49. Fixed to the shaft 49 is the toothed wheel 50 and rotatable on the same shaft 49 is the lever arm 51 to the upper end of which is pivotally mounted at 52 the double acting pawl 53 having the engaging ends 54, 55, the pivot 52 being intermediate said ends. The double acting spring 56 has each of its ends adapted to engage and hold the corresponding end of the pawl 53 in engagement with the teeth of the wheel 50. Mounted at 57 upon the lever arm 51 is the cam lever 58 arranged to engage either on one or the other side of the spring 56 to hold such portion of the spring out of engagement with the pawl. In other words, when the cam lever 58 is in the position shown in Fig. 10, the right end 55 of the pawl 53 will be in engagement with the toothed wheel 50, and the drive of the wheel 50 will be clockwise during that portion of the pivotal movement of the lever arm 51 which is clockwise. Upon comparing Figures 7 and 10, it will be found that such clockwise movement of the wheel 50 results in a forward drive of the boat. In the same manner when the cam lever 58 is shifted so as to render the end 54 of the pawl 53 ineffective and the end 55 effective, the drive of the wheel 50 will be contraclockwise during the contraclockwise movement of the lever arm 51, and the drive of the boat will be reverse or backward.

For giving the lever 51 the desired oscillatory movement, I have provided a construction which was devised in view of my observation that a contest which calls for the coordinated efforts of a number of persons is thereby additionally interesting and exciting, and furthermore with the aim of making the race as realistic a water contest as possible. Pivoted at 60 to the lever 51 is the link 61 which is pivoted at its other end 62 to the lower end of the bolt 63 which is arranged for relative transverse sliding movement in the superposed open ended slots 64 of the members 65. These members 65 are each pivoted intermediate its ends at 66 on the vertical posts 67 which are intended to simulate oar locks, the members 65 being intended to simulate both in structure and operation oars such as used to propel a row boat. These oars 65 are each provided at their adjacent ends with the open ends slots 64, the slotted ends of the members 65 being reversely chamfered away and overlapped as clearly shown in Fig. 9, with the slots 64 in register, and in position to receive the bolt 63. In this manner I provide a lost motion connection between the propeller and the operating means.

In Fig. 7 I have shown a modification in which the link 61 is moved back and forth by the lever 70 pivoted to the frame at its lower end 71 and to the link 61 at the intermediate point 72. This lever 70 is moved by what might be termed a hand car motion.

In the practical use of my invention, the vehicles are all lined up at the start with the necessary number of participants in each, four being provided for, in the embodiment disclosed, although as is obvious this number may be varied. For the comfort and convenience of the participants the transverse seats 74, 75 are provided. As will be seen upon viewing Fig. 6, the occupants of the front seat will take care of the vehicle propulsion, and the occupants of the rear seat 75 will take care of the vehicle steering apparatus, both of which as illustrated and described are of a character particularly intended for a water race. It is obvious however, that the objects of my invention can be attained in a land race by appropriately adapting the steering and propelling mechanism for such use. It is also obvious that the controlling and propulsion need not necessarily be manual, and that the propulsion may be motor operated.

At the starting signal, the participants each begins his allotted task, to advance his vehicle to its goal as quickly as possible. From what has been set out previously, it will be obvious that the members of each group in a vehicle will at once find themselves in difficulties due to lack of coordination, with the difficulties multiplied many times as the boats begin bumping each other not only out of their direct paths, but causes them to spin. In the embodiments disclosed, the mechanism operated by the participants is of a character to give a realistic touch to the race, although as is obvious these also may be modified.

The mechanism for permitting of a ready shifting from the forward to the reverse drive, will be useful frequently during the race, and will be particularly useful where the race is a return race or where the boats have been spun through an angle of one hundred and eighty degrees, in which case the vehicle can be driven in the desired direction by the use of the reverse mechanism, without being compelled to resort to steering the boat back to its desired or original position.

Having thus described my invention and illustrated its use, what I claim as new and desire to secure by Letters Patent is the following:

1. In a device of the character described, in combination, a plurality of vehicle starting stations, each having a different indicating characteristic and a plurality of terminal stations each having an indicating characteristic which corresponds to that of a starting station, the paths between a correspondingly indicated stations crossing each other.

2. In a device of the character described, in combination, a plurality of vehicle starting stations each having a different indicating characteristic, and a plurality of terminal stations each having an indicating characteristic which corresponds to that of a starting station, the paths between correspondingly indicated stations being substantially of the same length and being arranged to cross each other.

3. In a device of the character described in combination, a plurality of vehicle starting stations, and a plurality of terminal stations each having a different indicating characteristic the paths between each starting station and a terminal station having a definite characteristic being of the same length as that between another starting station and another terminal station having different characteristic.

4. In a device of the character described, in combination, a body of water, stations arranged in spaced groups, the stations in one group each having a different indicating characteristic and the stations in another group each having an indicating characteristic corresponding to that of one in the first mentioned group, the paths between correspondingly indicated stations in the two groups crossing each other whereby a vehicle passing from a station in one group to the correspondingly indicated station in another group is compelled to cross the path of another vehicle passing similarly between other stations in the two groups.

5. In a device of the character described, in combination, a body of water, stations arranged in spaced groups, the landing stations in one group each having a different indicating characteristic, and the landing stations in another group each having an indicating characteristic corresponding to that of one in the first mentioned group, the paths between correspondingly indicated stations in the two groups crossing each other whereby a vehicle passing from a station in one group to the correspondingly indicated station in another group is compelled to cross the path of another vehicle passing similarly between stations in the two groups, the paths between correspondingly indicated stations being of the same length.

6. In a device of the character described, in combination, a plurality of starting stations, and a pluralitty of terminal stations, and a plurality of members, each to be moved from a starting station to a terminal station, the whole being so arranged and constructed that each member is to be moved from a starting station to a predetermined terminal station, the paths of the members crossing each other.

7. In a device of the character described, in combination, stations arranged in groups, and a plurality of members each arranged to move from a station in one group to a predetermined station in another group, the paths of the members crossing each other.

8. In a device of the character described, in combination, a plurality of vehicles, and a race course therefor having a different path for each vehicle all arranged and constructed so that the paths of the vehicles cross each other.

9. In a device of the character described, in combination, a plurality of vehicles, and a race course therefor having a different path for each vehicle all arranged and constructed so that the paths of the vehicles cross each other, the vehicles each having a circular exterior wall.

10. In a device of the character described, in combination, a vehicle having its outer wall circular, and steering and propelling means therefor arranged in alignment diametrically of the vehicle.

11. In a device of the character described, in combination, a plurality of vehicles, the vehicles each having its outer wall circular, steering and propelling means therefor arranged in alignment diametrically of the vehicles, and a race course therefor arranged and constructed so that the paths of the vehicles cross each other.

12. In a device of the character described, in combination, a plurality of groups of vehicles, and a race course having a group of paths for each group of vehicles all arranged and constructed so that the paths of the vehicles of each group cross each other.

13. In a device of the character described, in combination, a vehicle, propelling means and steering means therefor, each requiring the coordinated efforts of a plurality of persons.

14. In a device of the character described, in combination, a water vehicle having its outer wall circular and propelling means therefor arranged centrally of said outer wall.

15. In a device of the character described, in combination, a water vehicle having its outer wall circular and propelling means therefor arranged centrally of said outer wall, said propelling means being arranged to operate diametrically of the vehicle.

16. In a device of the character described, in combination, a water vehicle, propelling means therefor comprising oar like members, and manually controlled means for causing the propelling means to drive either forwardly or rearwardly at will.

17. In a device of the character described, in combination, a water vehicle, a propeller, means operating said propeller comprising a plurality of oscillating members, and a lost motion connection between the propeller and said means.

In witness whereof, I have hereunder signed my name this 11th day of August, 1921.

JULIUS GOLDMAN.